No. 695,307. Patented Mar. 11, 1902.
C. M. HAMPSON.
TURN TABLE.
(Application filed Nov. 20, 1901.)
(No Model.) 2 Sheets—Sheet 1.
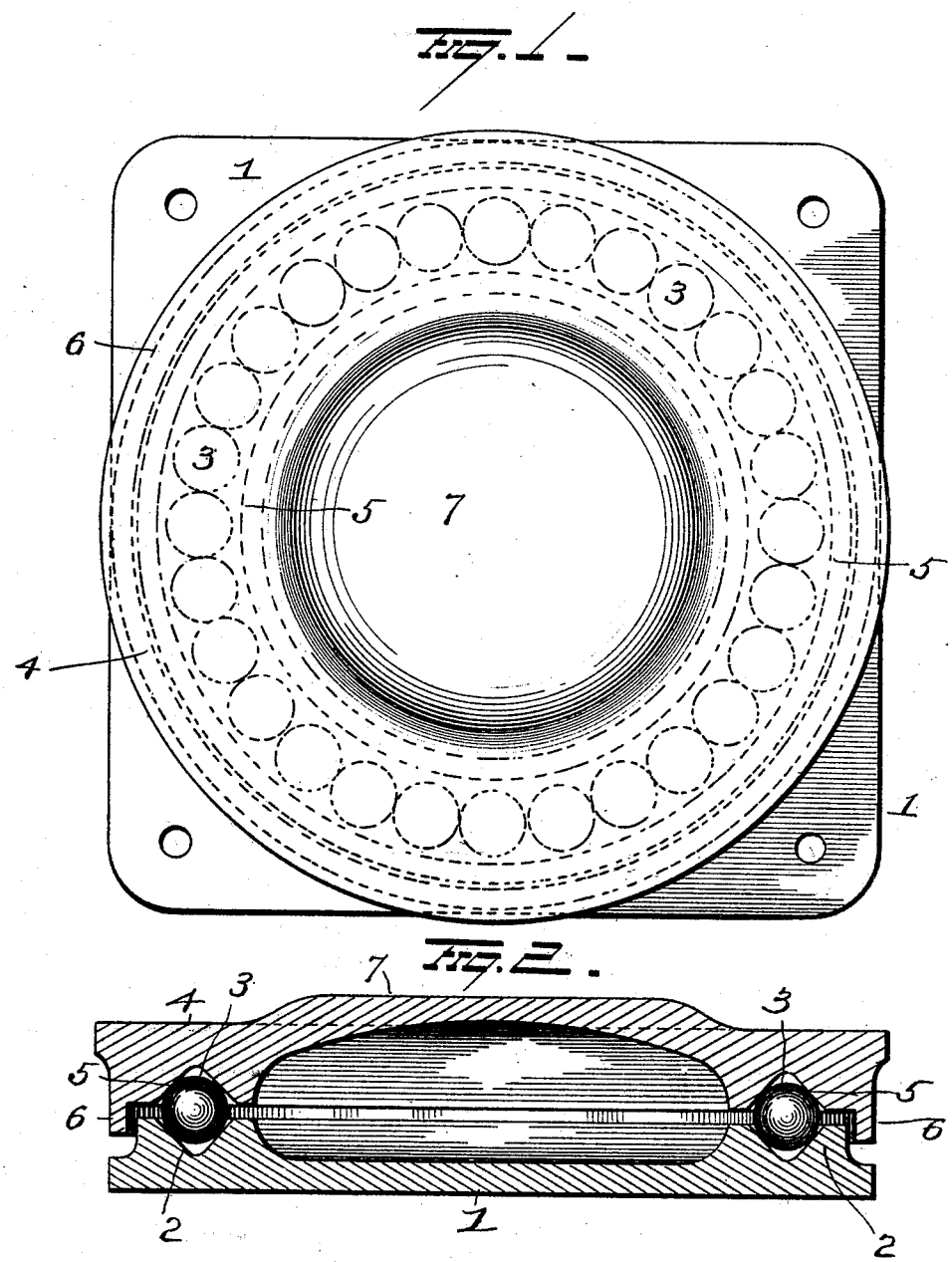
WITNESSES
INVENTOR
C. M. Hampson
Attorney No. 695,307. Patented Mar. 11, 1902.
C. M. HAMPSON.
TURN TABLE.
(Application filed Nov. 20, 1901.)
(No Model.) 2 Sheets—Sheet 2.

WITNESSES
E. Nottingham
G. F. Downing

INVENTOR
C. M. Hampson
By H. A. Seymour
Attorney

UNITED STATES PATENT OFFICE.

CHARLES M. HAMPSON, OF DENVER, COLORADO.

TURN-TABLE.

SPECIFICATION forming part of Letters Patent No. 695,307, dated March 11, 1902.

Application filed November 20, 1901. Serial No. 83,031. (No model.)

*To all whom it may concern:*

Be it known that I, CHARLES M. HAMPSON, a resident of Denver, in the county of Arapahoe and State of Colorado, have invented certain new and useful Improvements in Turn-Tables; and I do hereby declare the following to be a full, clear, and exact description of the invention, such as will enable others skilled in the art to which it appertains to make and use the same.

My invention relates to an improvement in turn-tables, the object of the invention being to provide a device of this character which will dispense with the necessity for rails on the table, which will be ball-bearing, and which will be so constructed as to protect the ball-bearings from foreign matter.

A further object is to provide a turn-table which will be extremely simple in construction, comparatively cheap to manufacture, and strong and durable when in use.

With these objects in view the invention consists in certain novel features of construction and combinations and arrangements of parts, as will be more fully hereinafter described, and pointed out in the claims.

Figure 3:
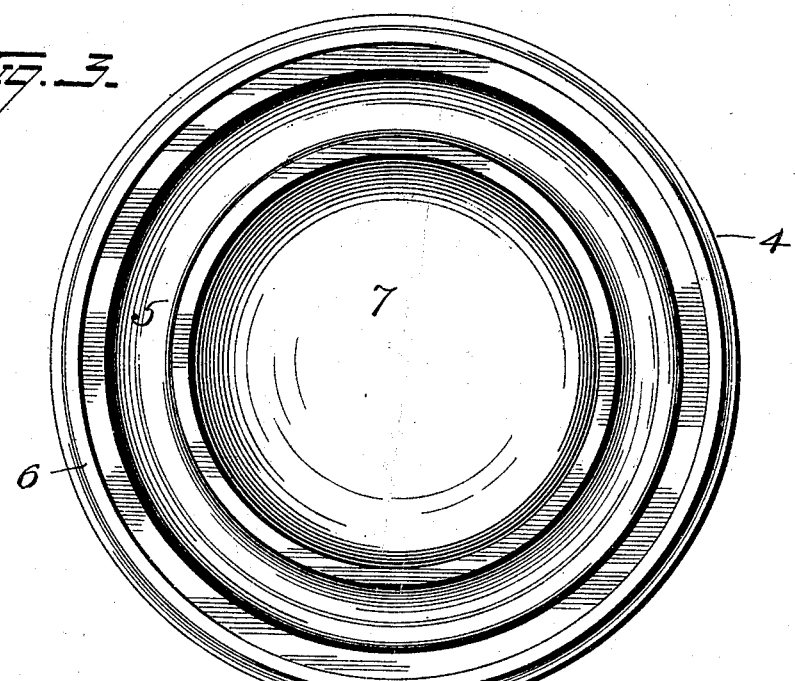
Figure 4:
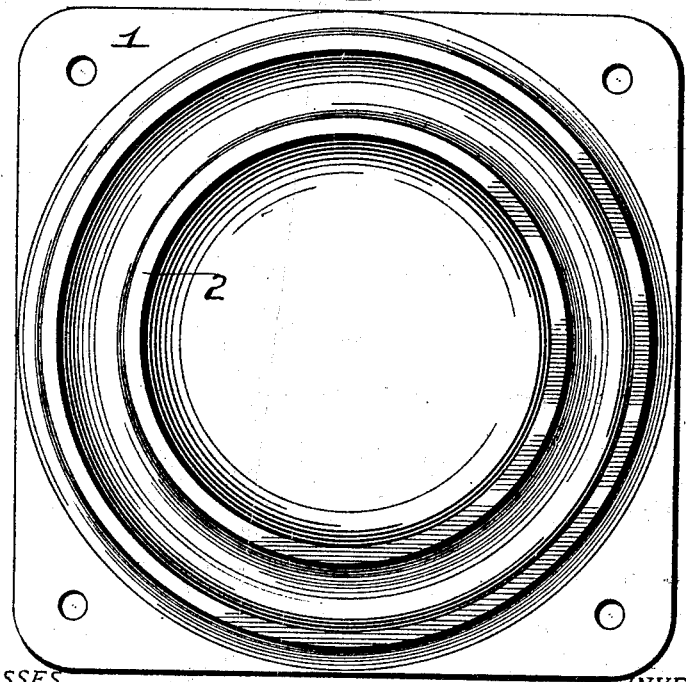

In the accompanying drawings, Figure 1 is a plan view illustrating my improvements. Fig. 2 is a view in section of the same. Fig. 3 is a bottom view of the top plate, and Fig. 4 is a top view of the bottom plate.

1 represents the bottom plate, which is preferably rectangular and made with holes in the respective corners for the reception of bolts or screws to secure the turn-table where desired. On this bottom plate 1 is provided a circular enlargement 2, having a groove V shape in cross-section on its upper face, forming a raised or elevated runway for balls 3. The top plate or table 4 is circular and made with a circular groove 5, V-shaped in cross-section on its lower face near its periphery to receive the balls 3 and run thereon, and the lower outer edge or periphery of the table is made with a depending flange 6, projecting down far enough to overlap the upper portion of the enlargement or runway 2 and prevent the entrance of dirt or other foreign matter to the ball-bearings. By making the grooves for the balls V shape in cross-section the balls have but limited bearing against the sections of the table, hence create but very little friction and considerably reduce the wear on all the parts.

The table 4 is made with a central circular raised portion or dome 7, whose central portion is preferably flattened and forms a guide for the wheels of the vehicle run onto the table, the dome 7 holding the wheels to either side thereof and dispensing with the necessity for a track, while at the same time serving as a guide for the wheels entering or departing in any direction.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A turn-table comprising a bottom plate having a raised circular runway V-shaped in cross-section, balls on said runway, an upper plate mounted to turn on said balls, and a central raised portion or dome on the upper face of the upper plate, the said raised portion or dome serving as a guide for the wheels of the vehicle.

2. A turn-table comprising a bottom plate having a raised circular runway the latter being V-shaped in cross-section, balls in said runway, an upper plate mounted to turn on said balls, a flange projecting down from said upper plate to overlap the raised runway on the lower plate, and a central circular raised portion or dome on the upper face of the upper plate, the said raised portion or dome operating as a guide for the wheels of the vehicle.

In testimony whereof I have signed this specification in the presence of two subscribing witnesses.

CHAS. M. HAMPSON.

Witnesses:
F. W. HOPKINS,
LLEWELYN JONES.